United States Patent

[11] 3,616,209

[72] Inventors Bernard Maurice Laine;
 Jean Claude Hondermarck; Robert Goux,
 all of Lavera, Bouches du Rhone, France
[21] Appl. No. 700,017
[22] Filed Jan. 24, 1968
[45] Patented Oct. 26, 1971
[73] Assignee The British Petroleum Company Limited
 London, England
[32] Priority Jan. 31, 1967
[33] Great Britain
[31] 04580/67

[54] SOLVENT EXTRACTION PROCESS
 6 Claims, No Drawings
[52] U.S. Cl. .................................................. 195/28,
 195/82
[51] Int. Cl. ..................................................... C12c 11/00
[50] Field of Search ........................................... 195/82, 3
 H, 28

[56] References Cited
 UNITED STATES PATENTS
3,268,419 8/1966 Champagnat et al. ........ 195/82
3,268,412 8/1966 Champagnat et al. ........ 195/3

*Primary Examiner*—A. Louis Monacell
*Assistant Examiner*—Seymour Rand
*Attorney*—Morgan, Finnegan, Durham & Pine ABSTRACT: Solvent extraction of a solid material which is contaminated with at least one hydrocarbon and water which comprises, in a first extraction stage consisting of one or more extraction steps, extracting a contaminated solid material with a mixture of an alcohol and a hydrocarbon with which it forms an azeotrope, the alcohol and azeotrope forming hydrocarbon respectively being employed at a ratio by volume within the range 30:70 to 70:30.

Preferably in a second extraction stage consisting of one or more extraction steps, following the first extraction stage, the treated solid material from the first stage is extracted with a solvent comprising or consisting of the alcohol, thereafter recovering the treated solid material.

Suitably the azeotrope-forming hydrocarbon is normal hexane. Suitably the alcohol is ethanol, propanol, isopropanol or a butanol.

Suitably the process of the invention is applied to a crude or partially refined product of the growth of a micro-organism on a hydrocarbon substrate in the presence of an aqueous nutrient medium.

Preferably the micro-organism is a yeast.

SOLVENT EXTRACTION PROCESS

This invention relates to a process for the solvent extraction of a solid material which is contaminated with at least one hydrocarbon and water for the partial to complete removal of the contaminants.

According to the present invention there is provided a process which comprises, in a first extraction stage consisting of one or more extraction steps, extracting a contaminated solid material with a mixture of an alcohol and a hydrocarbon with which it forms an azeotrope, hereinafter referred to as the "azeotrope-forming hydrocarbon," said alcohol and azeotrope-forming hydrocarbon respectively being employed at a ratio by volume within the range 30:70 to 70:30.

Preferably in a second extraction stage consisting of one or more extraction steps, following said first extraction stage the treated solid material from the first stage is extracted with a solvent comprising or consisting of said alcohol, thereafter recovering the treated solid material.

Preferably the extract fractions recovered from the extraction stages are fed, separately or after blending, to a distillation stage, consisting of one or more distillation steps, for the separate recovery of (a) an azeotropic mixture of the alcohol and the azeotrope-forming hydrocarbon, (b) an azeotropic mixture of the alcohol and water and (c) a residue fraction, thereafter blending part of the azeotropic mixture of the alcohol and water with part of the azeotropic mixture of the alcohol and azeotrope-forming hydrocarbon, the parts being selected to give a mixture of the alcohol and azeotrope-forming hydrocarbon containing these materials respectively at a ratio by volume in the range 30:70 to 70:30 and recycling this mixture to the first extraction stage.

Suitably the temperature of the extraction steps lies in the range 30°–100° C. and where appropriate 30°–60° C.

Suitably the azeotrope-forming hydrocarbon is normal hexane. Suitably the alcohol is ethanol, propanol, isopropanol or a butanol.

Suitably the process of the invention is applied to a crude or partially refined product of the growth of a micro-organism on a hydrocarbon substrate in the presence of an aqueous nutrient medium.

Preferably the micro-organism is a yeast. Preferably the yeast contains at least 20 percent by weight, more particularly 100–200 percent by weight of water, based on the weight of the pure micro-organism in the dry state. By the term "micro-organism in the dry state" we mean a micro-organism in the state obtained by drying at 120° C.

If necessary the yeast may be mixed with water before extraction.

Preferably the ratio of water to total alcohol and azeotrope-forming hydrocarbon lies in the range 1:4 to 1:10 by weight.

If desired, the extraction as hereinbefore described may be repeated, preferably after addition of water to the yeast to give a water content as in the first stage.

According to another object of the present invention there is provided a process which comprises cultivating a micro-organism in the presence of a feedstock which consists of or contains a hydrocarbon, in the presence of an aqueous nutrient medium and in the presence of a gas containing free oxygen and thereafter separating part of the aqueous nutrient medium; thereafter, with or without an intervening treatment, treating a micro-organism-containing product fraction by solvent extraction as hereinbefore described.

Usually the straight chain hydrocarbons will be present in the feedstock according to the invention as paraffins: however, the straight chain hydrocarbons may be present as olefins; also there may be used a mixture containing straight chain paraffins and olefins;

Suitable feedstocks to the process of the invention include kerosene, gas oils and lubricating oils; these feedstocks may be unrefined or may have undergone some refinery treatment, but must contain a proportion of straight chain hydrocarbons in order to fulfil the purpose of this invention. Suitably the petroleum fraction will contain 3–45 percent by weight of straight chain hydrocarbons.

The process of the invention is of particular value for the treatment of petroleum gas oil fractions which contain straight chain hydrocarbons in the form of waxes, since by the process of the invention a gas oil of improved pour point is obtained while the waxes are converted to a valuable product.

It is an important feature of this invention that when cultivating yeasts in the presence of the feedstocks hereinbefore-described under conditions favoring the growth of the yeasts at the expense of the straight chain hydrocarbons, the other hydrocarbons, for example isoparaffins naphthenes and aromatics are not metabolized or, at most, the proportion which is metabolized is very small. Furthermore, unlike conventional chemical processes governed by the law of mass action, the rate of removal of straight chain hydrocarbons is not substantially reduced as the proportion of these hydrocarbons in the overall mixture of hydrocarbons decreases (except, of course, in the very final stages of removal). Thus, when desired, the percentage conversion of straight chain hydrocarbons which is achieved can be maintained at a value approaching 100 percent without necessitating a very disproportionate expenditure of contact time to achieve small improvements. Furthermore, in a continuous process, this high percentage conversion can be achieved without resorting to the use of a long reaction path.

By the application of this process under conditions which limit the metabolization of the straight chain hydrocarbons it is possible to operate with the removal of only a desired proportion of these hydrocarbons.

Within the term 'micro-organism' used herein we include mixtures of micro-organisms. Preferably the micro-organism is capable of growing on at least some normal paraffins.

Micro-organisms which are cultivated as herein described may be yeasts, molds or bacteria.

The yeasts in this specification are classified according to the classification system outlined in "The yeasts, a Taxonomic Study" by J. Lodder and W. J. W. Kreger-Van Rij, published by North Holland Publishing Co. (Amsterdam) (1952).

The bacteria mentioned in this specification are classified according to the classification system outlined in "Bergey's Manual of Determinative Bacteriology" by R. S. Breed, E. G. D. Murray and N. R. Smith, published by Bailliere, Tindall and Cox (London) 7th Edition (1957).

Preferably when a yeast is employed this is of the family Cryptococcaceae and particularly of the subfamily Cryptococcoideae however, if desired there may be used, for example, ascosporogeneous yeasts of the subfamily Saccharomycoideae. Preferred genera of the Cryptococcoideae subfamily are *Torulopsis* (also known as *Torula*) and *Candida*. Preferred strains of yeast are as follows. In particular it is preferred to use the specific stock of indicated Baarn reference number; these reference numbers refer to CBS stock held by the Centraal Bureau vor Schimmelculture, Baarn, Holland and to INRA stock held by the Institut National de la Recherche Agronomique, Paris, France.

|  |  | Preferred strain |
|---|---|---|
| *Candida* | CBS *lipolytica* |  |
| *Candida* | *pulcherrima* | CBS 610 |
| *Candida* | *utilis* |  |
| *Candida* | *utilis, Variati major* | CBS 841 |
| *Candida* | *tropicalis* | CBS 2317 |
| *Torulopsis* | *colliculosa* | CBS 133 |
| *Hansenula* | *anomala* | CBS 110 |
| *Oidium* | *lactis* |  |
| *Neurospora* | *sitophila* |  |
| *Mycoderma* | *cancoillote* | INRA: STV 11 |

Of the above *Candida lipolytica* is particularly preferred.

If desired the micro-organism may be a mold. Suitable molds are *Penicillium* and preferably there is used *Penicillium expansum*. Another suitable genus is *Aspergillus*.

If desired the micro-organism may be a bacterium.

Suitably the bacteria are of one of the orders:
Pseudomonadales, Eubacteriales and Actinomycetales.

Preferably the bacteria which are employed are of the families Corynebacteriaceae, Micrococcaceae, Achromobacteraceae, Actincymycetaceae, Rhizobiaceae, Bacillaceae and Pseudomonadaceae, Preferred species are *Bacillus megaterium*, *Bacillus subtilis* and *Pseudomonas aeruginosa*. Other strains which may be employed include:

Bacillus amylobacter
Pseudomonas natriegens
Arthrobacter sp.
Micrococcus sp.
Corynebacterium sp.
Pseudomonas syringae
Xanthomonas begoniae
Flavobacterium devorans
Acetobacter sp.
Actinomyces sp.
Nocardia opaca These bacteria grow in the presence of the following aqueous nutrient medium:

| | |
|---|---|
| NH$_4$Cl | 0.5 grams |
| NaCL | 4.0 grams |
| MgSO$_4$·7H$_2$O | 0.5 grams |
| Na$_2$HPO$_4$·12H$_2$O | 0.5 grams |
| KH$_2$PO$_4$ | 0.5 grams |
| Water to make up to | 1,000 mls. |

Preferably the pH of this medium is maintained at 7. Another aqueous nutrient medium is:

| | |
|---|---|
| K$_2$HPO$_4$ | 1 gram |
| KH$_2$PO$_4$ | 0.5 grams |
| MgSO$_4$·7H$_2$O | 0.5 grams |
| CaCl$_2$ | 0.1 grams |
| NaCl | 0.1 grams |
| Water to make up to 1,000 mls. | |

A suitable nutrient medium for yeasts and molds has the composition:

| | |
|---|---|
| (NH$_4$)$_2$HPO$_4$ | 2 grams |
| KCl | 1.15 grams |
| MgSO$_4$·H$_2$O | 0.65 grams |
| AnSO$_4$ | 0.17 grams |
| MnSO$_4$·4H$_2$O | 0.045 grams |
| FeSO$_4$·7H$_2$O | 0.068 grams |
| Tap water | 200 mls. |
| Yeast extract | 0.025 grams |
| Distilled water (to make up to 1,000 mls.) | |

The growth of the micro-organism used is favored by the addition to the culture medium of a very small proportion of extract of yeast (an industrial product rich in essential nutrilites, that is, growth factors obtained by the hydrolysis of a yeast) or more generally of the essential nutrilites. The essential nutrilites include biotin, pantothenic acid, nicotinic acid, thiamine, inositol, and pyridoxine. The quantity of yeast extract added is preferably of the order of 25 parts per million. The quantity of each nutrilite required varies between about 0.1 parts per million for biotin to about 10 parts per million for inositol.

The growth of the micro-organism takes place at the expense of the feedstock fraction with the intermediate production of bodies having an acid function, principally fatty acids, in such a manner that the pH of the aqueous mineral medium progressively diminishes. If one does not correct it, the growth is fairly rapidly arrested and the concentration of the micro-organism in the medium, or cellular density, no longer increases so that there is reached a so-called stationary phase.

Preferably therefore the aqueous nutrient medium is maintained at a desired pH by the stepwise or continuous addition of an aqueous medium of high pH value. Usually, when using molds or yeasts and in particular when using *Candida lipolytica*, the pH of the nutrient medium will be maintained in the range 3–6 and preferably in the range 4–5. (Bacteria require a higher pH usually 6.5–8). Suitable alkaline materials for addition to the growth mixture include sodium hydroxide, potassium hydroxide, disodium hydrogen phosphate and ammonia, either free or in aqueous solution.

The optimum temperature of the growth mixture will vary according to the type of micro-organism employed and will usually lie in the range 25°–35° C. When using *Candida lipolytica* the preferred temperature range is 28°–32° C.

The takeup of oxygen is essential for the growth of the micro-organism. The oxygen will usually be provided as air. In order to maintain a rapid rate of growth, the air, used to provide oxygen, should be present in the form of fine bubbles under the action of stirring. The air may be introduced through a sintered surface. However there may be used the system of intimate aeration known as "vortex aeration."

It has been found that by the use of yeast of the strain *Candida lipolytica* in a process according to the invention in which aeration is effected by "vortex aeration," a high growth rate is achieved whereby the generation time lies in the range 2–5 hours and the cell concentration is increased by a factor of up to 1,000 in 2 days.

Micro-organisms, and in particular yeasts, when first cultivated with the use of hydrocarbon fractions as feedstock, sometimes grow with difficulty and it is sometimes necessary to use an inoculum of micro-organism which has previously been adapted for growth on the hydrocarbon fraction which it is intended to use. Furthermore the micro-organism although cultivated in the presence of an aqueous mineral medium containing the appropriate nutrient elements, may grow with difficulty, because the hydrocarbon fraction does not contain the growth factors which exist in carbohydrate feedstocks, unless these growth factors are added.

In batch operation, the micro-organism will usually grow initially at a low rate of increase in cellular density. (This period of growth is referred to as the "lag phase"). Subsequently the rate of growth will increase to a higher rate of growth; the period at the higher rate of growth is referred to as the "exponential phase" and subsequently again the cellular density will become constant (the "stationary phase").

A supply of the micro-organism for starting the next batch will preferably be removed before the termination of the exponential phase.

The growth operation will usually be discontinued before the stationary phase.

At this stage it will usually be possible to separate the micro-organism, contaminated with some unmetalabolized feedstock and aqueous nutrient medium, from the bulk of the unmetalabolized feedstock fraction. Preferably the separation is achieved by means of a decantation; additionally or alternatively centrifuging may be used. The fraction containing a micro-organism is now subjected to treatment with an aqueous-treating medium containing a surface-active agent.

Preferably the micro-organism fraction is vigorously mixed with the aqueous surface-active agent, and, without a further period of growth of the micro-organism, is subjected to further separation, preferably by centrifuging, to recover a micro-organism fraction and a spent aqueous phase containing hydrocarbon impurities removed from the micro-organism. If necessary, the washing and separating steps may be repeated, once or more, using an aqueous surface-active agent in the washing stage. After washing with surface-active agent it is necessary to wash with an aqueous medium which is free of surface-active agent; preferably this medium will be water. Again if desired, a series of washing and separation stages may be employed.

Preferably the washing stages are carried out until the hydrocarbon content of the micro-organism is less than 7 percent based on the weight of the micro-organism (as calculated for the dry state). Preferably said content of hydrocarbons will be less than 5 percent.

As the surface-active agent employed for washing there may be used cationic surface-active agents such as stearyltrimethyl ammonium chloride, nonionic surface-active agents, for example the condensates of oleic acid and ethylene oxide, or anionic surface-active agents, for example sodium alkyl sulfates.

The fraction containing the micro-organism is then subjected to solvent extraction under the conditions hereinbefore described.

The hydrocarbons recovered in the extract phase by solvent extraction, if metabolizable, may be recycled to the micro-organism cultivation stage.

A yeast which has been freed from the whole or part of its lipids and the contaminating hydrocarbons by one of the methods described hereinbefore is a new industrial product.

According to a preferred feature of this invention there is provided a process which comprises cultivating a micro-organism in a manner as hereinbefore described in the presence of a petroleum fraction consisting in part of straight chain hydrocarbons and having a mean molecular weight corresponding to at least 10 carbon atoms per molecule, and in the presence of an aqueous nutrient medium; and in the presence of a gas-containing free oxygen, and separating from the mixture, on the one hand, the micro-organism and, on the other hand, a petroleum fraction having a reduced proportion of straight chain hydrocarbons or which is free of said straight chain hydrocarbons and thereafter treating the micro-organism as hereinbefore described.

Preferred methods for use in the cultivation of the micro-organism and for the recovery of the product are described in British Pat. specification Nos. 914567 and 914568 and U.S. Pat. application Ser. No. 755,019.

This invention is illustrated but in no way limited with reference to the following examples:

EXAMPLE 1

10 liters of the following aqueous mineral medium was introduced into a 15-liter stirred fermenter; parts are by weight:

| | |
|---|---|
| Sodium phosphate, tribasic | 3.4 |
| Potassium chloride | 0.6 |
| Magnesium sulfate | 0.3 |
| Ammonium sulfate | 2.5 |

Made up to 1,000 parts with soft water containing trace elements.
A suitable alternative medium has the composition:

| | |
|---|---|
| Diammonium phosphate | 2 |
| Potassium chloride | 1.15 |
| Magnesium sulfate, 7H$_2$O | 0.65 |
| Zinc sulfate | 0.17 |
| Manganese sulfate, 1H$_2$O | 0.045 |
| Ferrous sulfate, 7H$_2$O | 0.068 |
| Tap water | 200 |
| Yeast extract | 0.025 |
| Distilled water (to make up to 1,000 Parts). | |

To the fermenter was added a few parts per million of yeast extract and then 50 grams of *Candida lipolytica* in the form of an aqueous cream containing 20 percent by weight of dry material and then 150 grams of a heavy gas oil of petroleum origin containing 20 percent by weight of normal paraffins.

When the culture reached the desired concentration of yeast cells for continuous operation, the continuous feed, to the fermenter, of aqueous mineral medium and petroleum oil was started up. The temperature was maintained at 30° C. and the pH of the medium was maintained regulated at pH 4 by the addition of aqueous ammonia.

This emulsion was fed to a centrifugal separator from which were recovered three phases, being, in increasing order of density; (a) an oil phase containing the yeast cells, (b) an aqueous mineral medium phase (which may contain traces of oil and yeast and (c) a yeast cream containing approximately one part of yeast, four parts aqueous medium and a certain quantity of oil adhering to the yeast cells.

The yeast cream and an aqueous solution of a surface-active agent, were fed continuously to a mixer.

The surface-active agent was used at an aqueous concentration of 0.05 percent by volume, two parts by volume of the aqueous solution being added to one part by volume of the yeast cream. The surface-active agent was a material sold under the trade designation NI 29 and being the product obtained by condensing a mixture of lauric alcohol and myristic alcohol with ethylene oxide, the product having an ethylene oxide chain of an average 8.5 units per terminal group.

The mixture so obtained was centrifuged to obtain three fractions in increasing order of density: (a) an oil phase, (b) an aqueous phase containing the surfactant product which was recycled to the mixer and (c) a second yeast cream containing one part by weight of yeast (which was still slightly contaminated by the oil) with four parts by weight of aqueous liquid containing the surfactant.

This second yeast cream was passed with water to a mixer and the mixture so obtained was centrifuged to obtain: (a) an oil phase, (b) an aqueous phase and (c) a thick yeast cream containing 20 percent by weight of yeast (estimated as dry yeast) and 80 percent by weight of water and which contained only a very small quantity of oil.

After a subsequent water-rinsing followed by centrifuging there was obtained a yeast product containing 65 percent by weight of water, together trace amounts of hydrocarbon contaminant. By further centrifuging there was obtained an impure yeast cream containing circa one parts by weight of dry contaminated yeast per 1.5 parts by weight of water.

This yeast cream was then pumped into an extractor which was in the form of a filtering drum which was rotated with its axis horizontal. A solvent mixture consisting of three parts in volume of isopropyl alcohol and five parts in volume of an azeotropic mixture (of which the composition is normal hexane 80 percent by weight and isopropyl alcohol 20 percent by weight) was poured into the extractor, the volumes of solvent being based on one part by volume of dry (contaminated) yeast.

The mixture was maintained at 80° C. for 20 minutes and then the solvent drawn off, finally under vacuum.

A second extraction step was carried out identical to the first.

In a second extraction stage the solid material which was recovered was washed with isopropyl alcohol at a rate of 4 volumes for 1 volume of dry yeast at 50° C. for 90 minutes. The remaining solvents and contaminant were removed. Finally the yeast product was dried in superheated steam.

The analysis of the former yeast cream which was treated by solvent extraction and the final yeast product after solvent extraction is given in the following table.

| | Yeast cream | Final yeast product |
|---|---|---|
| Nitrogen % by wt. of dry yeast | 9.8 | 11 |
| Total lipids % by wt. of dry yeast | 13 | 0.5 |

Yeast product thus obtained, freed of contaminant, can be used as a fodder material.

The spent solvent fractions were collected and blended. The mixture was heated to 60° C. by use of tubular exchangers, then taken into a 24-plate distillation column operating under atmospheric pressure and with a reflux ratio of 1:1 to recover three fractions as follows:
a. top fraction
b. side stream fraction
c. bottom fraction The composition of these fractions, in parts by weight per 100 parts by weight of solvent mixture distilled, was as follows:

| | |
|---|---|
| Fraction (a) | 58.7 |

| | |
|---|---|
| Isopropanol | 18.7 |
| Normal hexane | 40.0 |
| Fraction (b) | 21.8 |
| Isopropanol | 18.9 |
| Water | 2.9 |
| Fraction (c) | 19.5 |
| Isopropanol | |
| Water | 17.5 |
| Lipids | 2.0 |

Fractions (a) and (b) were blended, to provide the solvents for the two extraction stages.

EXAMPLE 2

The process described in example 1 was repeated, the "second yeast cream" as therein described was passed with water to a mixer and the mixture centrifuged to obtain the phases as described except that the yeast cream which was obtained contained 15 percent by weight of yeast (estimated as dry yeast) and 84.4 percent by weight of water and 0.6 percent by weight of gas oil.

After spray-drying part of this material the balance was blended back to give a yeast paste containing one part by weight of dry contaminated yeast per 1.5 parts by weight of water. This material was pumped into an extractor and further treated as described in example 1 with the same result as described therein.

Example 3

The process described in example 1 was repeated except that *Candida tropicalis* was used in place of *Candida lipolytica*. Similar results were obtained.

EXAMPLE 4

The process described in example 2 was repeated except that *Candida tropicalis* was used in place of *Candida lipolytica*. Similar results were obtained.

What we claim is:

1. A process for the purification of a solid containing material which is a crude or partially refined product of the growth of a micro-organism on a hydrocarbon substrate in the presence of an aqueous nutrient medium, said solid micro-organism containing material being contaminated with at least one hydrocarbon and which contains water in an amount in excess of the amount of water present in the micro-organism in the dry state which process comprises, in a first extraction stage consisting of one or more extraction steps, extracting said solid micro-organism containing material with a mixture of an alcohol and an azeotrope-forming hydrocarbon, said alcohol and azeotrope-forming hydrocarbon respectively being employed at a ratio by volume within the range 30:70 to 70:30, thereafter in a second extraction stage consisting of one or more extraction steps, following said first extraction stage, the treated solid micro-organism containing material from the first stage is extracted with alcohol as the solvent, and thereafter recovering the purified micro-organism.

2. A process according to claim 1 wherein the extract fractions recovered from the extraction stages are fed, separately or after blending, to a distillation stage, consisting of one or more distillation steps, for the separate recovery of (a) an azeotropic mixture of the alcohol and the azeotrope-forming hydrocarbon, (b) an azeotropic mixture of the alcohol and water and (c) a residue fraction, thereafter blending part of the azeotropic mixture of the alcohol and water with part of the azeotropic mixture of the alcohol and azeotrope-forming hydrocarbon, the parts being selected to give a mixture of the alcohol and azeotrope-forming hydrocarbon containing these materials respectively at a ratio by volume in the range 30:70 to 70:30 and recycling this mixture to the first extraction stage.

3. A process according to claim 1 which the azeotrope-forming hydrocarbon is normal hexane.

4. A process according to claim 1 in which the alcohol is ethanol, propanol, isopropanol or a butanol.

5. A process according to claim 1 which at least one solvent extraction step is carried out at a temperature in the range 30°–100b° C.

6. A process according to claim 1 in which the micro-organism contains at least 20 percent of water in excess of the water present in the micro-organism in the dry state.

* * * * *

UNITED STATES PATENT OFFICE
CERTIFICATE OF CORRECTION

Patent No. 3,616,209     Dated October 26, 1971

Inventor(s) Bernard Maurice Laine, Jean Claude Hondermarck and Robert Goux

It is certified that error appears in the above-identified patent and that said Letters Patent are hereby corrected as shown below:

...continued...

Column 6, line 26, "parts" should read -- part --;

Claim 1, line 1, after "solid", insert -- micro-organism --;

Claim 5, line 1, after "claim 1" insert -- in --; and line 3, "30°-100b°C." should read -- 30°-100°C. --.

Signed and sealed this 16th day of May 1972.

(SEAL)
Attest:

EDWARD M. FLETCHER, JR.
Attesting Officer

ROBERT GOTTSCHALK
Commissioner of Patents